United States Patent [19]

Schlenker

[11] 4,285,701
[45] * Aug. 25, 1981

[54] METHOD FOR SEPARATING ISOTOPES USING A VORTEX TUBE

[76] Inventor: Ralph F. Schlenker, R.R. 4, Indianola, Iowa 50125

[*] Notice: The portion of the term of this patent subsequent to Jun. 6, 1995, has been disclaimed.

[21] Appl. No.: 912,630

[22] Filed: Jun. 5, 1978

Related U.S. Application Data

[63] Continuation-in-part of Ser. No. 543,232, Jan. 23, 1975, Pat. No. 4,093,427.

[51] Int. Cl.³ .............................................. B01D 57/00
[52] U.S. Cl. ............................................ 55/17; 55/2; 55/101; 55/459 R; 62/5
[58] Field of Search .................... 55/2, 17, 101, 459 R; 62/5

[56] References Cited

U.S. PATENT DOCUMENTS

| | | | |
|---|---|---|---|
| 3,546,891 | 12/1970 | Fekete | 62/5 |
| 3,558,877 | 1/1971 | Pressman | 55/17 |
| 3,566,610 | 3/1971 | Fiore | 62/5 |
| 3,990,634 | 11/1976 | Hejlek | 55/459 |
| 4,092,130 | 5/1978 | Wikdahl | 55/17 |
| 4,093,427 | 6/1978 | Schlenker | 55/2 |

FOREIGN PATENT DOCUMENTS 2505864 10/1976 Fed. Rep. of Germany .............. 55/17

Primary Examiner—Bernard Nozick
Attorney, Agent, or Firm—Lynn G. Foster

[57] ABSTRACT

The present invention utilizes a vortex tube for separating isotopes. A gas mixture containing the isotopic molecules, with or without a carrier gas, enters the vortex tube under pressure and is separated into a hot discharge flow stream and a cold discharge flow stream. The hot discharge is enriched in lighter isotopic molecules whereas the cold discharge flow stream is enriched in the heavier isotopic molecules. The vortex tube can be used in a single stage or multistage isotope separation apparatus. An electromagnetic beam may be used in conjunction with one or more vortex tubes to selectively and simultaneously excite the vibrational mode of other than the major isotopic components.

10 Claims, 7 Drawing Figures

U.S. Patent    Aug. 25, 1981    4,285,701
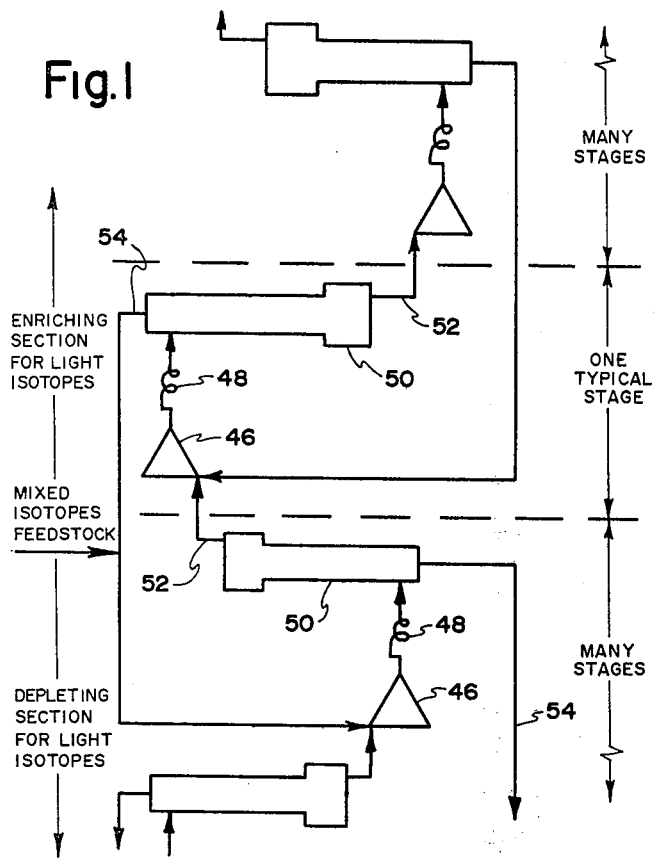
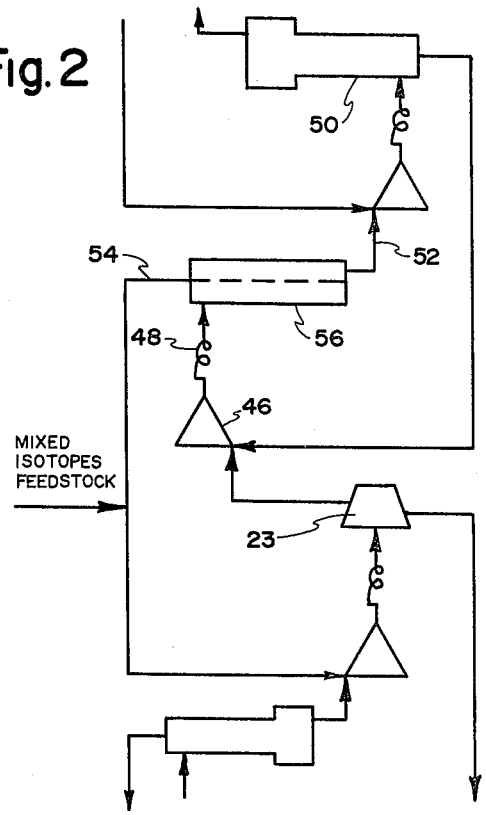
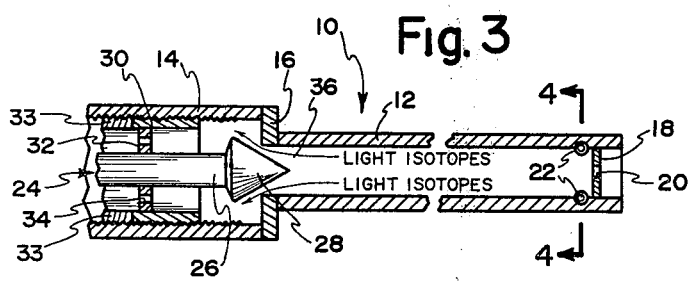
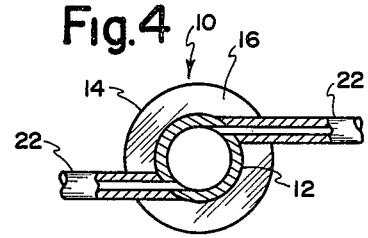
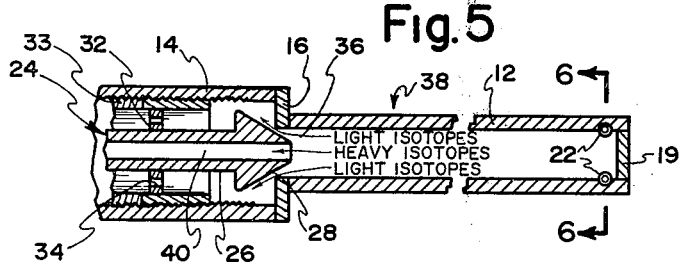
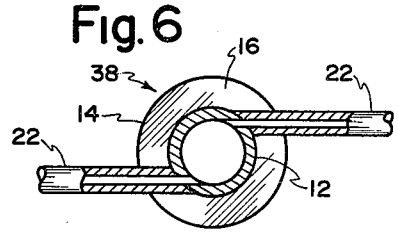
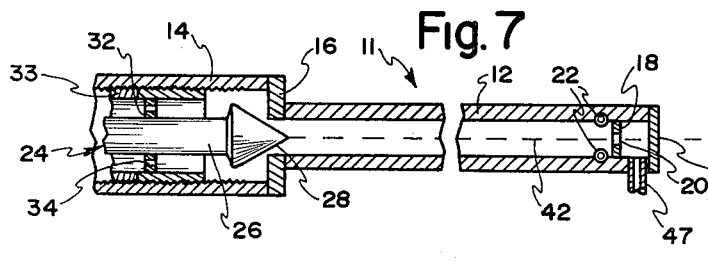
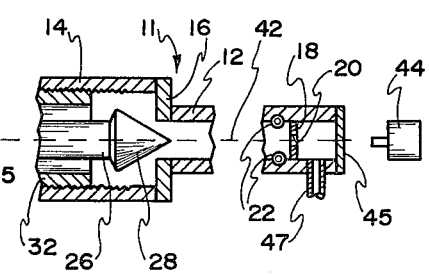

ered around the drawings.

METHOD FOR SEPARATING ISOTOPES USING A VORTEX TUBE

BACKGROUND

Continuity

This application is a continuation-in-part of my copending U.S. Patent Application Ser. No. 543,232, filed Jan. 23, 1975, now U.S. Pat. No. 4,093,427.

FIELD OF INVENTION

This invention relates generally to separation of isotopes and more particularly to vortical separation of isotopes under controlled conditions, with or without electromagnetic beam excitation.

PRIOR ART

The known prior art is of record in the file history of said U.S. Pat. No. 4,093,427 as are the distinctions between the prior art and the present invention, all of which is incorporated herein by reference.

BRIEF SUMMARY AND OBJECTS OF THE INVENTION

The separation of isotopes is particularly important with respect to work in the development of nuclear energy. Isotopes are atoms of the same basic element which have different nuclear masses, but identical chemical properties and atomic numbers. Uranium is an example of an element which includes many isotopes having different masses. Dueterium is an isotope of hydrogen which can be separated by use of its mass difference.

As pointed out during the prosecution of U.S. Pat No. 4,093,427, presently known methods for separating isotopes include the use of highly cumbersome and expensive equipment. Some methods include utilizing a centrifuge and others use diffusion apparatus for separating the isotopes. Several other methods are known.

The present invention utilizes one or more vortex tubes to separate the isotopes. A vortex tube is an instrument capable of converting an ordinary supply of compressed gas into two streams, one hot and one cold. Operating in this manner, the vortex tube is an energy separator. The present invention utilizes the vortex tube as a mass separator. Thus, it is possible to separate a mixture of isotopes having different masses.

According to the present invention, a gaseous feedstock mixture containing isotopic molecules with or without a carrier gas enters the vortex tube in a compressed state and exits the vortex tube in two discharge streams of unequal temperature. The hotter discharge stream is enriched in the lighter isotope component and depleted in the heavier isotope. Conversely, the colder discharge stream is enriched in the heavier isotope and depleted in the lighter isotope component. The vortex tube may be operated as an isotopic molecular separator, as a single stage separator, or at option may be arranged with many vortex tubes operating in a cascade. Further, the vortex tube stages may be adapted to operate in conjunction with other separative means, such as a gaseous diffusion barrier or centrifuge, substituted for the vortex tubes.

A beam of electromagnetic waves of discrete frequency along the central axis of the vortex tube may be used. The frequency of the electromagnetic waves is tuned to the vibrational mode of other than the major isotopic component in the mixture. One or more of the other isotopes are excited and caused to transport or scatter from the central core or axis of the vortex tube to the periphery thereof away from the major isotope, thereby facilitating the separation of the isotopes. The major isotope has a different vibrational mode and, therefore, will remain substantially unaffected by the mentioned electromagnetic beam.

Therefore, a primary object of the present invention is the provision of a novel method for separating isotopes.

A further object of the present invention is the provision of a unique method which is economical, and which separates the isotopes with relatively inexpensive equipment.

A further object of the present invention is the provision of an improved method which utilizes simple equipment which requires a minimum of energy input for its operation.

These and other objects and features of the present invention will be apparent from the detailed description taken with reference to the accompanying drawings.

BRIEF DESCRIPTION OF THE DRAWINGS

FIG. 1 is a schematic diagram illustrating the simultaneous operation of several vortex tubes in an isotope separation cascade device;

FIG. 2 is a schematic diagram illustrating the conection of several vortex tubes with other species of isotope separation units;

FIG. 3 is a sectional side view of a counterflow vortex tube;

FIG. 4 is a view taken along line 4—4 of FIG. 3;

FIG. 5 is a sectional side view of a direct flow vortex tube;

FIG. 6 is a sectional view taken along line 6—6 of FIG. 5; and

FIG. 7 is a sectional view of a counter flow vortex tube utilizing an electronic beam to excite the isotopes along the longitudinal axis thereof.

DETAILED DESCRIPTION OF THE ILLUSTRATED EMBODIMENTS

A typical counterflow vortex tube is shown in FIG. 3. A counterflow assembly 10 comprises a flow tube 12 having at one end thereof an enlarged diameter portion 14. Between tube 12 and enlarged diameter portion 14 is an annular body flange 16. At one end of tube 12 is a diaphragm 18 having a cold outlet opening 20 which is positioned along the longitudinal axis of tube 12. Adjacent diaphragm 18 are a pair of inlet nozzles 22 for introducing a gaseous mixture into the tube 12. Nozzles 22 are positioned so that they inject the mixture tangentially into the tube so that the mixture will swirl in a circular motion around the longitudinal axis of tube 12. (See FIG. 4.)

A flow control assembly 24 is positioned adjacent annular flange 16. Assembly 24 includes a shank 26 and a cone-shaped head 28 which is inserted into tube 12 in a needle valve-like fashion. Shank 26 is operatively connected to a lock ring 30 by means of a radially extending web 32. Web 32 includes apertures 34 therein for permitting gas to escape therethrough. Lock ring 30 is threaded within the interior of enlarged diameter portion 14 so as to permit the longitudinal adjustment of the position of head 28 with respect to flow tube 12. Thus, it can be seen that a hot outlet opening 36 is provided between the inner margins of annular flange 16 and the outer surface of head 28.

FIG. 5 illustrates a direct flow assembly 38 which includes many of the same components that counterflow assembly 10 includes. The primary difference between the two assemblies is that diaphram 19 of assembly 38 does not include an opening therein such as opening 20 found in assembly 10. Additionally a cold outlet opening is provided by a longitudinal bore 40 which extends axially through flow control assembly 24.

The preferred material for the two vortex tubes is nickel. All adjoining surfaces of the components of the vortex tubes are welded with the exceptions of the adjoining plane surface between the lock ring 30 and the outer cylindrical portion of the flow control assembly 24 and also the threaded faces between the lock ring 30 and the enlarged diameter portion 14 and the threaded faces between the outer cylindrical portion 33 of the flow control assembly 24 and the enlarged diameter portion of 14.

In operation of the device in FIG. 3, a gaseous mixture of one or more isotopes is introduced through inlet nozzles 22. The mixture swirls within tube 12 and progresses longitudinally toward flow control cone 24. Hot outlet opening 36 is restricted so that the gas which is permitted to exit from opening 36 exits at a rate less than a rate at which it is introduced through inlet nozzles 22. This restriction may be adjusted by longitudinal threaded movement of the flow control assembly 24 and the lock ring 30. Because not all of the gas is permitted to exit through outlet 36, a certain amount is redirected along the longitudinal axis of tube 12 and exits outwardly through cold outlet opening 20. The gaseous mixture exiting through outlet 36 is enriched in light isotopes and the gaseous mixture exiting outwardly through outlet opening 20 is enriched in heavier isotopes.

In the device of FIG. 5, the gaseous mixture is introduced in the same fashion as previously described. However, the heavier isotopes exit outwardly through bore 40 in flow control assembly 24 instead of exiting outwardly through opening 20 as in FIG. 3, tube 10. Thus, it can be seen that in direct flow vortex tube 38, the gaseous flow continues in one direction along the length of tube 12. In counterflow assembly 10, the heavy isotopes exit in reverse direction from the direction that the light isotopes exit. In direct flow assembly 38 the light and heavy isotopes exit the same end of the tube.

Referring to FIG. 7, a modified form of the invention is shown which utilizes a beam of electromagnetic waves designated by the numeral 42. A microwave beam generator 44 directs beam 42 axially along the length of one or more coaxial tubes 12 so that beam 42 is approximately aligned with the longitudinal center lines thereof and has a diameter restricted not to exceed that of the opening 20. As schematically illustrated in FIG. 7, more than one vortex tube can be geometrically aligned along the common axis of the electromagnetic beam so that energy emanating from a single electromagnetic beam generator can be simultaneously utilized for isotopic separation by two or more vortex tubes. Components of the vortex tubes along the effective length of the electromagnetic beam are constructed to materials which are transparent or nearly transparent to the electromagnetic beam radiation.

The wavelength of the electromagnetic beams may vary within the range of 0.1 to 20 micrometers and may be a continuous wave type or pulse. If a continuous wave type beam is used, the unfocused power may vary within the range of 0–10 watts per square centimeter using available equipment, or up to 25 watts per square centimeter if specialized custom equipment is fabricated.

The modification of FIG. 7 is designated by the numeral 11. It is similar to the device of FIG. 3 with exception that a window 45 is placed over the right hand end and a gas outlet tube 47 is provided for facilitating exit of the gas coming through opening 20. The window must be transparent to the microwave beamed into the tube and yet be noncorrosive insofar as the gas input. When several vortex tubes in succession are used in conjunction with a single electromagnetic beam, the windows and the flow control assemblies must be constructed of transparent material, e.g. crystal quartz, fused silica, silver chloride, arsenic modified selenium glass, arsenic trisulfide glass and/or potassium bromide.

The same modification can be adapted to the direct flow assembly as has been shown in FIG. 7 for the counterflow. Diaphragm 19 of tube 38 would be constructed of material transparent to the beam. The beam would then be directed through a window at the left of bore 40 and thence through bore 40 along the axis of assembly 38 and thence out through diaphragm 19. Also, the direction of the beam may be reversed.

Since the microwave beam has an energy content, the material where it finally impinges must be capable of heat dissipation. In FIG. 7, the cone section must allow the microwave energy to pass through to an external target, where the beam spends energy and accompanying local heat dissipation will take place. Adaptation of the direct flow tube assembly to microwave excitation will similarly require an exit window 19 of transparent material in line with the beam entrance, and backed up by a target and heat sink to dispose of the beam energy without disruption of heat balances in the vortex tube assembly. Cooling of the vortex tube or portions thereof by forced air or water is also beneficial.

Each isotope has a vibrational mode which is unique to that particular isotope. Thus it is possible by adjusting the frequency of beam 42 to tune the frequency to the vibrational mode of the lighter isotope. The effect of this is to excite the lighter isotopes and cause them to thermally diffuse or spread radially outwardly to the outer peripheral edge of tube 12. Also, in a feedstock gas having a mixture of isotopic components denoted "A" and "B" and in which mixture the number of "A" isotopic molecules is greater than the number of "B" different isotopic molecules, the electromagnetic beam is preferably tuned to selectively excite the vibrational mode of the "B" isotopes.

For a feedstock gas composed of three (3) or more isotopic components, denoted "A", "B", "C", . . . "X", etc., and in which mixture the number of "A" isotopic molecules is greater than the number of molecules of any other individual isotopic component, the electromagnetic beam is preferably tuned to selectively excite the vibrational modes of one or more of the isotopic components denoted "B", "C", . . . "X"; explicitly excluding the "A" isotopic component.

It is to be appreciated that applicable pressures for separation of isotopes as described may vary. The absolute pressure at the inlet or inlets to the separators may vary within the range of 40 to 400 torr. Likewise, the absolute pressure at the outlet or outlets may vary within the range of 0.1 to 10 torr. Furthermore, operation of one or more vortex tubes below standard atmospheric pressure increases the mean free path between collisions of the feedstock molecules, to thereby enhance the separation of isotopes.

Furthermore, applicable separation temperatures may vary. The inlet temperature of the feedstock mixture must be sufficiently high to prevent other than negligible condensation and/or freezing of the feedstock material in or around the vortex tube. By other than negligible condensation and freezing is meant those conditions when the outlet flow rate of either the hot or cold outlet flow streams diminishes by five (5) percent from an initial steady-state value. The exact temperature of the feedstock gas at the vortex tube inlet or inlets with the nature of the particular molecular specie being separated and the inlet pressure. For example, nominal values are 260° C. for $UF_6$ and 35° C. for $H_2O$ with HDO or $D_2O$.

The mass flow rate division of the feedstock gas passing out the axial outlet can be in the range of five (5) to ninety-five (95) percent of the inlet mass flow rate. Correspondingly, the remainder of the feedstock gas passing out of the other outlet, located radially outward from the vortex tube axis, will have a mass flow rate range amounting to ninety-five (95) to five (5) percent of the feedstock gas.

The vortex tube may be operated wih a feedstock mixture of gases comprised of the isotopes of the molecular specie to be separated plus a carrier gas having different molecular specie. When separating heavy isotopes such as U235 and U238 contained in the gaseous form $UF_6$, the carrier gas can be hydrogen or helium. When separating light isotopes, such as $D_2O$ or HDO from $H_2O$, the carrier gas can be $CF_3Cl$.

Referring to FIG. 1, a cascade system is shown. Each stage is comprises of a pump 46 and a cooler 48 followed by a vortex tube 50. The vortex tube has two outlet conduits. One outlet conduit 52 transports material enriched in the lighter isotope to the pump inlet of the succeeding stage and the other conduit 54 transports material depleted in lighter isotopes to the pump inlet of the prior stage.

Referring to FIG. 2 of the drawings, a schematic diagram is shown of an isotopic molecule separation cascade identical to FIG. 1 with exception that some, but not all, of the vortex tubes have been removed and are replaced by other species of isotope separators. The substituted isotope separators may include but are not limited to, diffusion barriers 56 and/or centrifuge devices 23.

Thus it can be seen that the device accomplishes at least all of its stated objectives.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method for separating heavier from light isotopes, comprising:
 introducing a gaseous feedstock mixture containing relatively light and relatively heavy isotopes under sufficient pressure and temperature into an elongated cylindrical vortex tube in a circumferential fashion so as to impart a swirling action of said mixture within said tube around the longitudinal axis thereof which tends to separate said mixture into a warmer outer stream enriched in lighter isotopes and a cooler inner stream enriched in heavier isotopes;
 enhancing said thermodynamic separation by axially directing an electromagnetic beam along one stream to excite the vibrational mode of the minority isotope in one stream exclusive of the other ones in said one stream;
 converting the electromagnetically caused excitation of the minority isotope remaining in said one stream to thermal translation causing a further migration of the minority isotope into the other stream;
 drawing off said outer stream of said thermodynamically separated swirling mixture adjacent the cylindrical walls of said tube through an outer opening spaced radially outwardly from the longitudinal axis of said tube;
 drawings off the inner stream of said thermodynamically separated swirling mixture through an axial outlet located approximately along the longitudinal axis of said tube.

2. A method for separating heavier from light isotopes, comprising:
 introducing a gaseous feedstock mixture containing relatively light and relatively heavy isotopes under sufficient pressure and temperature into an elongated cylindrical vortex tube in a circumferential fashion so as to impart a swirling action of said mixture within said tube around the longitudinal axis thereof which tends to separate said mixture into a warmer outer stream enriched in lighter isotopes and a cooler inner stream enriched in heavier isotopes;
 enhancing said thermodynamic separation by electromagnetically exciting the vibrational mode of lighter isotopes remaining in inner stream exclusive of the heavier ones;
 converting the electromagnetic excitation of the lighter isotopes remaining in the inner stream to thermal translation causing a further migration of the lighter isotopes into the outer stream;
 drawing off said outer stream of said thermodynamically separated swirling mixture adjacent the cylindrical walls of said tube through an outer opening spaced radially outwardly from the longitudinal axis of said tube;
 drawing off the inner stream of said thermodynamically separated swirling mixture through an axial outlet located approximately along the longitudinal axis of said tube.

3. A method according to claim 2 where said electromagnetically exciting step comprises directing an electromagnetic beam solely substantially along the axis of the vortex tube and tuning the beam to solely excite the vibrational mode of said lighter isotopes.

4. A method according to claim 3 wherein the wave length of the beam is within the range of 0.1 to 20 micrometers.

5. A method according to claim 3 wherein the beam is a continuous wave type.

6. A method according to claim 3 wherein the beam is pulsed.

7. A method according to claim 3 wherein the unfocused power of the beam is a range of greater than zero up to 25 watts per square centimeter.

8. A method according to claim 3 wherein the beam is caused to pass through materials within the vortex tube which are essentially transparent to the beam.

9. A method according to claim 3 further comprising the step of cooling at least part of the vortex tube during excitation to remove excess heat generated.

10. A method for separating heavier from lighter isotopes, comprising:

introducing a gaseous feedstock mixture containing relatively light and relatively heavy isotopes under sufficient pressure and temperature, into a plurality of axially aligned elongated cylindrical vortex tubes, each in a circumferential fashion so as to impart a swirling action of said mixture within each said tube around the longitudinal axis thereof which separates said mixture into a warmer outer stream enriched in lighter isotopes and a cooler inner stream enriched in heavier isotopes;

enhancing said thermodynamic separation by electromagnetically exciting from a common source the vibrational mode of the lighter isotopes within the inner stream of each vortex tube exclusive of the heavier ones;

converting the electromagnetic excitation of the lighter isotopes remaining in the inner stream of each vortex tube to thermal translation causing a further migration of the lighter isotopes into the outer stream;

drawing off in each tube said outer stream of said thermodynamically separated swirling mixture adjacent the cylindrical walls of said tube through an outer opening spaced radially outwardly from the longitudinal axis of said tube;

drawing off in each tube the inner stream of said thermodynamically separated swirling mixture through an axial outlet location approximately along the longitudinal axis of the tube.

* * * * *